UNITED STATES PATENT OFFICE.

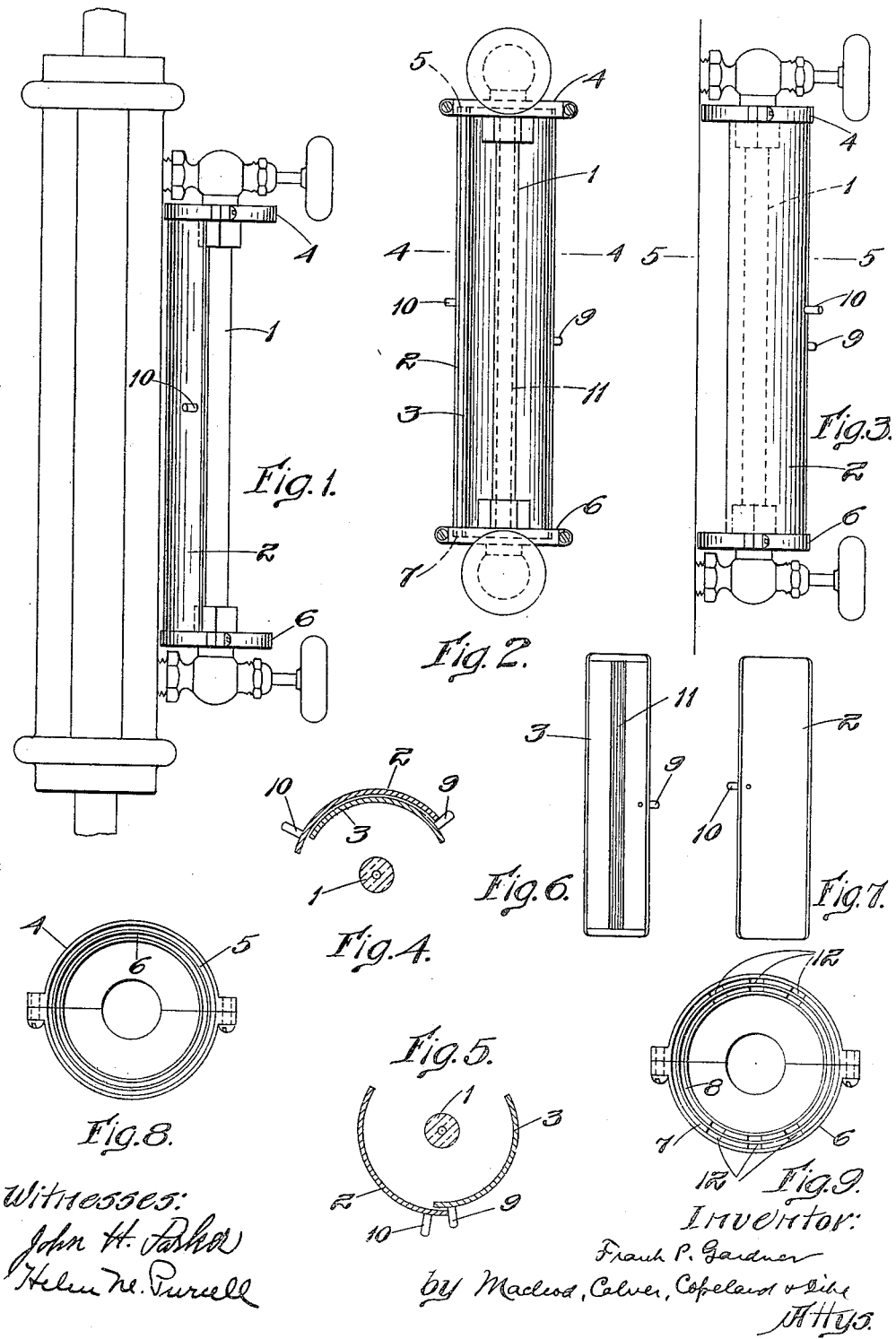

FRANK P. GARDNER, OF BOSTON, MASSACHUSETTS.

GAGE-GLASS SHIELD AND REFLECTOR.

1,131,692.  Specification of Letters Patent.  Patented Mar. 16, 1915.

Application filed July 21, 1914. Serial No. 852,304.

*To all whom it may concern:*

Be it known that I, FRANK P. GARDNER, citizen of the United States, residing at Boston, county of Suffolk, State of Massachusetts, have invented a certain new and useful Improvement in Gage-Glass Shields and Reflectors, of which the following is a specification, reference being had therein to the accompanying drawings.

The invention relates to an improvement in a device which may be used at the will of the operator either as a front shield to protect the person from the danger of flying glass in case of bursting of the glass, or as a reflector for ordinary use. It is important in ordinary usage that the gage glass shall be exposed to observation, not only in front but on the sides, and it is also important that when a new glass is installed the workman shall be fully protected against the danger from flying glass in case the new glass shall burst under the pressure of the steam while the glass is being first put under steam pressure after being installed. It is not especially important that there shall be any shield in the immediate rear of the glass, because that side comes toward the boiler and there is therefore no danger in that immediate direction, even if the glass does break, but the protector should extend for a considerable distance more than the immediate front of the gage. It should preferably extend for at least two thirds of the way around, because the workman might be standing at either side or in front. It is also important that it should be rotatable to set it at will at any position around its axis, so as to protect the workman wherever he stands, and it is also important that in ordinary use the gage should be exposed to view, not only at the front, but also at the sides, so that the entire exposed portion should be at least two-thirds of the way around, in order that the engineer may observe the height of the water in the gage easily on either of the two sides as well as in front. It is not necessary, however, that the reflector which is at the back shall extend for over a third of the way around.

For these reasons it is the object of the present invention to provide a device which when used as a reflector will occupy only a small segment but when used as a protector may be expanded to a much larger segment, for instance, when used as a reflector it may cover only about one hundred twenty degrees and when used as a protector it may be expanded to about two hundred and forty degrees and one object of the invention is to make the device of such form and so mounted that it may be easily shifted from the contracted form to the expanded form and vice versa. It may also be easily shifted in location from front to rear and vice versa.

The invention will be fully understood from the following description taken in connection with the accompanying drawings, and the novel features thereof will be pointed out and clearly defined in the claims at the close of the specification.

In the drawings,—Figure 1 is a side elevation of a gage equipped with my improved device showing it used as a reflector. Fig. 2 is a front elevation with the parts shown in the position as in Fig. 1 but omitting the boiler connections. Fig. 3 is a side elevation of the device adjusted to act as a shield. Fig. 4 is a section on line 4—4 of Fig. 2. Fig. 5 is a section on line 5—5 of Fig. 3. Figs. 6 and 7 are front elevations of the two sections which compose the shield. Fig. 8 is a detail plan of the top plate for the shield looking at the under side. Fig. 9 is a detail plan of the bottom plate looking down.

Referring now to the drawings,—1 represents a glass gage of the usual form of construction and having usual connections at the bottom for the admission of water from the boiler and valve connections at the top for the admission of steam.

The shield proper comprises two cylindrical segments, 2, 3 each preferably being of more than ninety degrees, preferably at least about one hundred twenty degrees and they are made of different diameters so that one may shut in in front of the other. As shown in the drawings, the segment 2 is made of slightly larger diameter than the segment 3. The top plate 4 is formed with an annular groove 5 in its under face of the same diameter as the larger cylinder segment 2 so that the upper end of the segment 2 may fit slidably into the said groove 5 and it is formed with a groove 6 of the same diameter as the smaller cylinder segment 3 to receive the upper end of said cylinder segment 3. The base plate 6 is formed with an annular groove 7 of proper diameter to receive the lower end of the larger segment 2 and with an annular groove 8 to receive the lower end of the smaller cylinder segment. The said cylinder segments 2, 3 have a sliding fit in the said annular grooves in the top and bottom plates 4, 6 so that each one of the said cylinder segments may be rotated around to any part of the circumference desired, the said top and bottom plates being stationary. The smaller segment 3 is provided with a pin 9 and segment 2 is formed with a pin 10 which serve as finger pieces. The pin 9 on the segment 3 serves also as a stop against which the edges of the segment 2 strike to limit the movement of the two segments with relation to each other. When the segments are moved to the rear so that the gage shall be open to view the two segments are nested together, as shown plainly in Fig. 4, thus exposing nearly two thirds of the glass to the view of the workman. When the device is to be used as a shield to protect the workman while changing the glass the two segments are brought to the front as shown in Fig. 5 and the opposite edge of the segment 2 from that which engaged the pin 9 in the rear position now engages the opposite side of the pin 9 in the front position, the shield now extending substantially two thirds around the gage so that there is only a relatively small portion uncovered and that uncovered portion is at the rear which will be adjacent the boiler front. Preferably the smaller segment 3 which forms the reflector when in the rear position is formed with a vertical stripe 11 of some color contrasting with the face of the reflector, preferably some bright color such as red, which will give an apparent tint to the water in the gage when viewed from the front, thus more easily locating the water level.

In order to keep the grooved ways in the base 6 cleared from dirt the base is preferably formed with slots 12 in the bottom of both grooves both in the front portion and in the rear portion, and as the segments are moved around and shifted from one position to the other they will push before them any dirt that may have fallen into the grooves until it reaches the slots when the dirt will fall through the slots, and thus the device as it were is self clearing.

What I claim is:

1. A protector for use with a gage glass for boilers, comprising two cylinder segments one of slightly greater diameter than the other, a head and a base each formed with two concentric annular grooves one of which is of the same diameter as the larger cylinder segment and the other of which is of the same diameter as the smaller cylinder segment, said grooves engaging said cylinder segments respectively and forming ways in which said cylinder segments are slidable in such manner that both segments may be brought to the rear, one inside of the other or at the will of the operator both segments may be brought to the front and adjusted to form an expanded front shield.

2. A protector for use with a gage glass for boilers, comprising two cylinder segments one of slightly greater diameter than the other, a head and a base each formed with two concentric annular grooves one of which is of the same diameter as the larger cylinder segment and the other of which is of the same diameter as the smaller cylinder segment, said grooves engaging said cylinder segments respectively and forming ways in which said cylinder segments are slidable in such manner that both segments may be brought to the rear, one nested inside of the other, or at the will of the operator both segments may be brought to the front and adjusted to form an expanded front shield, the said two segments being each of such portion of an entire cylinder that when combined at the front the two segments together will occupy more than one hundred eighty degrees and when shut together at the rear the combined segments will cover less than one hundred eighty degrees.

3. A protector for use with a gage glass for boilers, comprising two cylinder segments one of slightly greater diameter than the other, a head and a base each formed with two concentric annular grooves one of which is of the same diameter as the larger cylinder segment and the other of which is of the same diameter as the smaller cylinder segment, said grooves engaging said cylinder segments respectively and forming ways in which said cylinder segments are rotatable in such manner that both segments may be brought to the rear, one nested inside of the other, or at the will of the operator both segments may be brought to the front and adjusted to form an expanded front shield, each of said cylinder segments being substantially one hundred twenty degrees of a cylinder.

4. A protector for use with a gage glass for boilers, comprising two cylinder segments one of slightly greater diameter than the other, a head and a base each formed with two concentric annular grooves one of which is of the same diameter as the larger cylinder segment and the other of which is of the same diameter as the smaller cylinder segment, said grooves being engaged by said cylinder segments respectively and forming ways in which said cylinder segments are rotatable in such manner that both segments may be brought to the rear, one inside of the other or at the will of the operator both segments may be brought to the front and adjusted to form an expanded front shield, one of said cylinder segments being provided with a peripheral projection near one of its edges which is engaged by one edge of the other segment when the two segments are in the front position to form a stop and which is engaged by the other edge when in the rear position to form a stop in the rear position.

5. A protector for use with a gage glass for boilers, comprising two cylinder segments one of slightly greater diameter than the other, a head and a base each formed with two concentric annular grooves one of which is of the same diameter as the larger cylinder segment and the other of which is of the same diameter as the smaller cylinder segment, said grooves being engaged by said cylinder segments respectively and forming ways in which said cylinder segments are rotatable in such manner that both segments may be brought to the rear, one inside of the other or at the will of the operator both segments may be brought to the front and adjusted to form an expanded front shield, the said base being formed with slots in the bottom of the grooves which serve as discharge passages for accumulations in the grooves.

In testimony whereof I affix my signature, in presence of two witnesses.

FRANK P. GARDNER.

Witnesses:
HENRY W. PACKER,
WILLIAM A. COPELAND.

Copies of this patent may be obtained for five cents each, by addressing the "Commissioner of Patents, Washington, D. C."